US012604080B2

(12) United States Patent
Lee et al.

(10) Patent No.: US 12,604,080 B2
(45) Date of Patent: Apr. 14, 2026

(54) APPARATUS AND METHOD WITH IMAGE GENERATION

(71) Applicant: SAMSUNG ELECTRONICS CO., LTD., Suwon-si (KR)

(72) Inventors: Heesae Lee, Suwon-si (KR); Jiyeon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 18/307,213

(22) Filed: Apr. 26, 2023

(65) Prior Publication Data

US 2024/0147052 A1 May 2, 2024

(30) Foreign Application Priority Data

Nov. 2, 2022 (KR) ........................ 10-2022-0144740

(51) Int. Cl.
*H04N 23/63* (2023.01)
*H04N 23/60* (2023.01)
*H04N 23/71* (2023.01)
*H04N 23/72* (2023.01)
*H04N 23/80* (2023.01)

(52) U.S. Cl.
CPC ......... *H04N 23/631* (2023.01); *H04N 23/633* (2023.01); *H04N 23/64* (2023.01); *H04N 23/71* (2023.01); *H04N 23/72* (2023.01); *H04N 23/80* (2023.01)

(58) Field of Classification Search
CPC .... H04N 23/631; H04N 23/633; H04N 23/64; H04N 23/71; H04N 23/72; H04N 23/80; H04N 23/741; H04N 23/74; H04N 23/951
See application file for complete search history.

(56) References Cited

U.S. PATENT DOCUMENTS

| | | | | |
|---|---|---|---|---|
| 12,238,402 | B2 * | 2/2025 | Jeon ..................... | G06F 13/4282 |
| 2016/0063600 | A1 * | 3/2016 | Wuang .............. | G06Q 30/0631 |
| | | | | 705/26.7 |
| 2016/0262243 | A1 * | 9/2016 | Kishimoto ............ | H05B 45/20 |
| 2017/0048481 | A1 * | 2/2017 | Ryu ....................... | H04N 19/10 |
| 2018/0063526 | A1 * | 3/2018 | Choi .................... | H04N 19/124 |
| 2020/0396366 | A1 * | 12/2020 | Vanman ................ | H04N 23/73 |
| 2022/0053121 | A1 | 2/2022 | Falk et al. | |
| 2022/0358763 | A1 * | 11/2022 | Laaksonen ............. | G06T 11/60 |
| 2024/0427543 | A1 * | 12/2024 | Pan ........................ | G06V 10/25 |

FOREIGN PATENT DOCUMENTS

| | | | | |
|---|---|---|---|---|
| JP | 2017-147568 | A | 8/2017 | |
| JP | 2018-10498 | * | 1/2018 | ............. G06T 11/80 |
| JP | 2018-10498 | A | 1/2018 | |
| JP | 2022-778 | A | 1/2022 | |
| KR | 10-0900822 | B1 | 6/2009 | |

* cited by examiner

*Primary Examiner* — Hung H Lam

(74) *Attorney, Agent, or Firm* — NSIP Law

(57) ABSTRACT

An apparatus including a processor configured to execute a plurality of instructions and a memory storing the plurality of instructions, wherein execution of the plurality of instructions configures the processor to be configured to encode a dynamic event including a plurality of first images received from a camera, receive a selection of a target camera position and a target light quantity in response to a user input from among the plurality of first images, and generate a target image by performing decoding based on the target camera position and the target light quantity.

17 Claims, 21 Drawing Sheets

310

Camera position for each image

330

3D coordinates of pixel and appearance information for each image

510

610

710

720

750

APPARATUS AND METHOD WITH IMAGE GENERATION

CROSS-REFERENCE TO RELATED APPLICATIONS

This application claims the benefit under 35 USC § 119(a) of Korean Patent Application No. 10-2022-0144740, filed on Nov. 2, 2022, in the Korean Intellectual Property Office, the entire disclosure of which is incorporated herein by reference for all purposes.

BACKGROUND

1. Field

The following description relates to an apparatus and method with image generation.

2. Description of Related Art

It may be typically difficult to capture a background and a person at the same time with an image capturing device such as a smartphone, depending on a light quantity or an angle of a camera of the smartphone. When there is too much light or too little light, it may not be possible to capture the background and the person at the same time, because of a backlight effect.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided an apparatus including a processor configured to execute a plurality of instructions and a memory storing the plurality of instructions, and an execution of the plurality of instructions configures the processor to be configured to encode a dynamic event including a plurality of first images received from a camera, receiving a selection of a target camera position and a target light quantity in response to a user input from among the plurality of first images, and generate a target image by performing decoding based on the target camera position and the target light quantity.

Each of the plurality of first images may be captured at a different time.

The plurality of first images may be captured by a same camera.

The processor may be further configured to encode a light quantity of the plurality of first images and a position of the camera.

The processor may be further configured to provide a user interface for changing a light quantity and a position of the camera to capture the plurality of first images.

The processor may be further configured to determine that a light quantity corresponding to one of the plurality of first images may be the target light quantity in response to the selection and generate a plurality of second images by changing a position of a camera while a light quantity may be fixed to the target light quantity.

The processor may be further configured to determine that a position of a camera corresponding to one of the plurality of first images is the target camera position in response to the selection and generate a plurality of third images by changing a light quantity while the position of the camera is fixed to the target camera position.

The processor may be further configured to generate a plurality of fourth images from the plurality of first images by simultaneously modifying a position of the camera and a light quantity in each image of the plurality of first images and provide the plurality of fourth images as options for the selection.

In a general aspect, here may be provided a processor implemented method including encoding a dynamic event of a plurality of first images, selecting a target camera position and a target light quantity in response to a user input from among the plurality of first images, and generating a target image by performing decoding based on the target camera position and the target light quantity.

Each of the plurality of first images may be captured at a different time.

The plurality of first images may be captured by a same camera.

The encoding of the dynamic event may include encoding a light quantity of the plurality of first images and a position of a camera.

The method may include providing a user interface for changing a light quantity and a position of the camera to capture the plurality of first images.

The selecting of the target camera position and the target light quantity may include determining that a light quantity corresponding to one of the plurality of first images is the target light quantity in response to the selection and generating a plurality of second images by changing a position of a camera while a light quantity is fixed to the target light quantity.

The selecting of the target camera position and the target light quantity may include determining that a position of a camera corresponding to one of the plurality of first images may be the target camera position in response to the selection and generating a plurality of third images by changing a light quantity while the position of the camera is fixed to the target camera position.

The method may include generating a fourth plurality of images from the plurality of first images by simultaneously changing a position of the camera and a light quantity and providing the plurality of fourth images as options for the selection.

In a general aspect, a non-transitory computer-readable storage medium may store instructions that, when executed by a processor, cause the processor to perform any of the methods.

In a general aspect, here is provided an apparatus including a processor configured to execute a plurality of instructions and a memory storing the plurality of instructions, and an execution of the plurality of instructions configures the processor to be configured to present a plurality of images as a target position option and a target light quantity option, receive a selection from among the plurality of images of the target position option and the target light quantity option, and generate a modified image from among the plurality of images based on the target position option and the target light quantity option.

Figure 1:
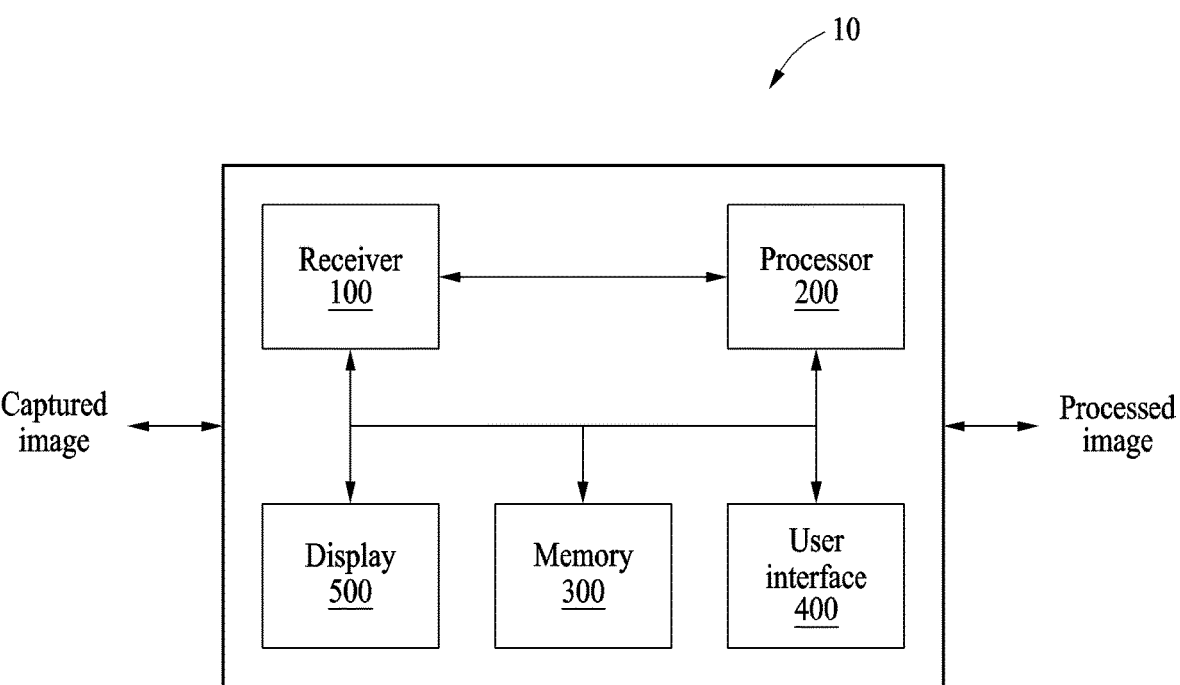
FIG. 1 illustrates an example of an image generating apparatus according to one or more embodiments.

Throughout the drawings and the detailed description, unless otherwise described or provided, it may be understood that the same drawing reference numerals refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used in connection with various example embodiments of the disclosure, any use of the terms "module" or "unit" means processing hardware, e.g., configured to implement software and/or firmware to configure such processing hardware to perform corresponding operations, and may interchangeably be used with other terms, for example, "logic," "logic block," "part," or "circuitry". As one non-limiting example, an application-predetermined integrated circuit (ASIC) may be referred to as an application-predetermined integrated module. As another non-limiting example, a field-programmable gate array (FPGA) or an application-specific integrated circuit (ASIC) may be respectively referred to as a field-programmable gate unit or an application-specific integrated unit. In a non-limiting example, such software may include components such as software components, object-oriented software components, class components, and may include processor task components, processes, functions, attributes, procedures, subroutines, segments of the software. Software may further include program code, drivers, firmware, microcode, circuits, data, database, data structures, tables, arrays, and variables. In another non-limiting example, such software may be executed by one or more central processing units (CPUs) of an electronic device or secure multimedia card.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Technology such as high dynamic range (HDR) has been developed to solve the backlight issue arising when there is too much or too little light. However, there is a natural phenomenon of a shadow that is created on a face due to a physical property of the light, and it may not be possible to physically change the position of the lighting to be appropriate for a face.

FIG. 1 illustrates an example of an image generating apparatus according to one or more embodiments.

Referring to FIG. 1, an image generating apparatus 10 may generate an image. The image may be an image of an object formed by refraction or reflection of light, and may represent a shape of an object using a line or a color. For example, the image may include information in a form to be processed by a computer.

The image generating apparatus 10 may process a captured image to generate a processed image. The captured image may be captured by a camera.

The image generating apparatus 10 may include a receiver 100 and a processor 200. The image generating apparatus 10 may further include a memory 300, for example. In another example, the image generating apparatus 10 may further include a user interface 400. In another example, the image generating apparatus 10 may further include a display 500.

In a non-limiting example, the receiver 100 may include a receiving interface. The receiver 100 may receive a plurality of first images captured by the camera. The receiver 100 may output the plurality of first images to the processor 200.

The memory 300 may include computer-readable instructions. The processor 200 may be configured to execute computer-readable instructions, such as those stored in the memory 300, and through execution of the computer-readable instructions, the processor 200 is configured to perform one or more, or any combination, of the operations and/or methods described herein. The memory 300 may be a volatile or nonvolatile memory.

The processor 200 may further execute programs, and/or may control the image generating apparatus 10, and may include any one or a combination of two or more of, for example, a central processing unit (CPU), a graphic processing unit (GPU), a neural processing unit (NPU) and tensor processing units (TPUs), or the like, but is not limited to the above-described examples. The processor 200 may also be representative of one or more electronic control units (ECUs).

The volatile memory device may be implemented as a dynamic random access memory (DRAM), a static RAM (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nano-tube RRAM, a polymer RAM (PoRAM), a nano floating gate memory (NFGM), a holographic memory, a molecular electronic memory device, or an insulator resistance change memory.

The user interface 400 may provide the capability of inputting and outputting information regarding a user and an image. The user interface may include a network module for connecting to a network and a universal serial bus (USB) host module for forming a data transfer channel with a mobile storage medium. In addition, the user interface 400 may include one or more input/output devices, such as the display device 500, a mouse, a keyboard, a speaker, or a software module for controlling the input/output device.

The display device 500 may be implemented using a liquid crystal display (LCD), a light-emitting diode (LED) display, a plasma display panel (PDP), a screen, a terminal, or any other type of display configured to display the images and information to be displayed by the image display apparatus. A screen may be a physical structure that includes one or more hardware components that provide the ability to render a user interface and receive user input. The screen may include any combination of a display region, a gesture capture region, a touch-sensitive display, and a configurable area. The screen may be part of an apparatus, or may be an external peripheral device that is attachable to and detachable from the apparatus. The display may be a single-screen display or a multi-screen display. A single physical screen may include multiple displays that are managed as separate logical displays permitting different content to be displayed on separate displays even though they are part of the same physical screen.

The processor 200 may encode a dynamic event of the plurality of first images. The dynamic event may refer to a series of images, such as the plurality of first images, captured by an image device within a predetermined period of time where each image may have a different positional and lighting quality. The processor 200 may encode a light quantity of the plurality of first images and a position of the camera. For example, the processor 200 may record, encode, or store a position of each respective image of the plurality of first images as well as sets of pixel of the respective first images.

Each of the first images may be captured at a different time. The first images may be captured by a same camera.

The processor 200 may select a target camera position and a target light quantity in response to a selection of a user of the camera for the plurality of first images. In an example, a user may be presented with an option from among the plurality of first images where the user may select a desired target camera position and a target light quantity (i.e., a preferred amount of lighting for the image). As described below, a dynamic event may be where a user takes multiple images of an event, object, view, person, or other type of image. The user selection may include an image with a preferred position and/or another image with a preferred amount of lighting.

The processor 200 may choose the target light quantity based on a light quantity of one of the plurality of first images in response to the selection from the user. The processor 200 may provide the user with a plurality of second images captured by changing the position of the camera while the light quantity is fixed to the target light quantity. That is, the processor may form or generate the new images from the plurality of first images where the new/second images each have an adjusted light quality.

The processor 200 may choose the target camera position where a position of the camera corresponding to one of the plurality of first images based on the selection by the user. The processor 200 may display? a plurality of third images captured by changing the light quantity while the position of the camera is fixed to the target camera position. That is, the processor may form or generate the new plurality of third images from the plurality of first images, or the plurality of second images, where the new/third images each are from the target camera position.

The processor 200 may display a user interface (e.g., user interface 400) for changing the light quantity and the position of the camera to capture the plurality of first images. The processor 200 may receive input from the user interface 400. The user interface may be displayed by the display 500.

In a non-limiting example, the image generating apparatus 10 may render images (e.g., images 510-550), and visualize the images through the display 500. The processor 200 may also, or alternatively, output images, for example, using the user interface 400, which may be wiredly connected to an exterior display, for example, for display of the images, or other rendered images, by the exterior display. In another example, the image generating apparatus 10 may include an internal display on which the rendered images are provided. In another example, the connections between the processor 200, display 500, and user interface 400 may be wireless.

The processor 200 may generate another plurality of images by modifying the plurality of first images by simultaneously changing the position of the camera and the light quantity and may provide the modified plurality of first images to the user as options to be selected from.

The processor 200 may generate a target image by performing decoding based on the target camera position and the target light quantity.

The memory 300 may store data for an operation or an operation result.

Figure 2:
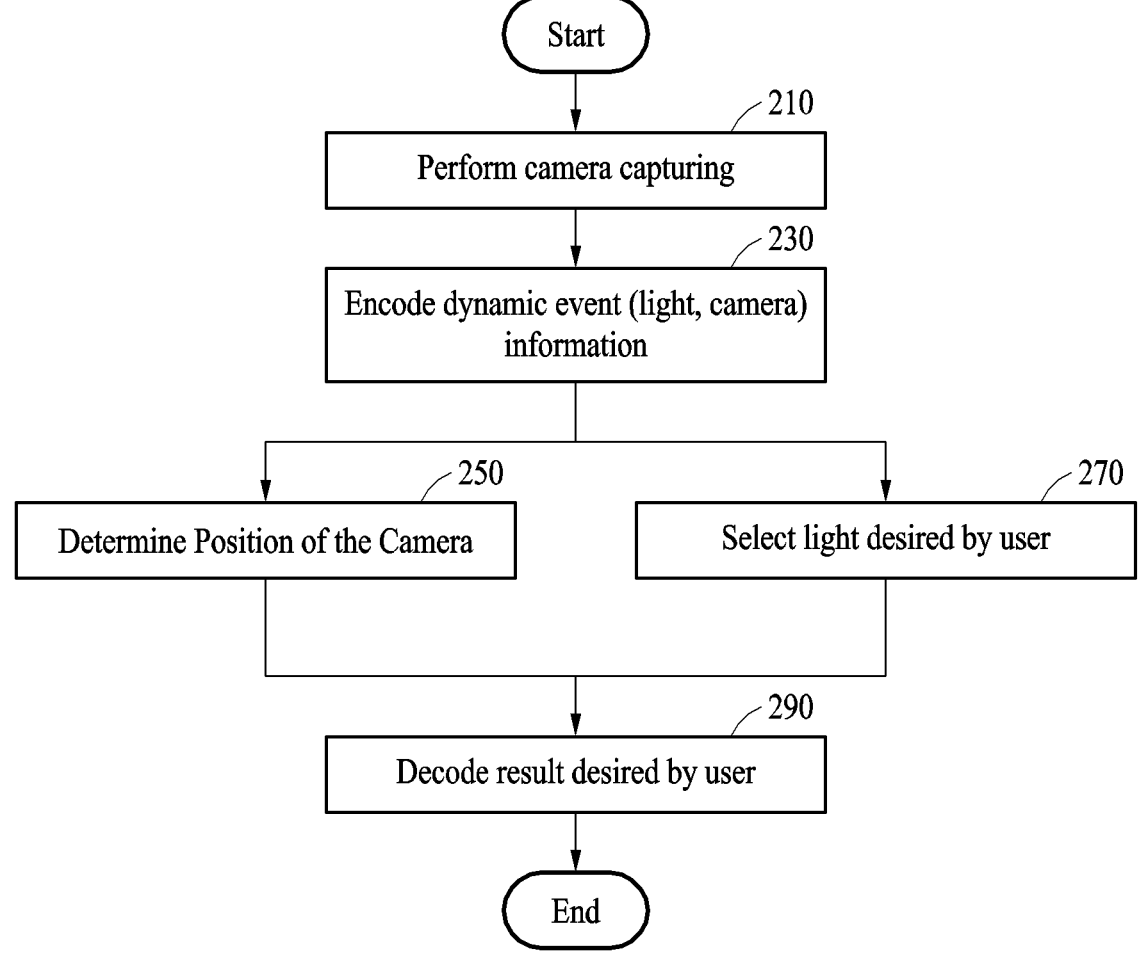
FIG. 2 illustrates an example of an operation of the image generating apparatus of FIG. 1.

FIG. 2 illustrates an example of an operation of the image generating apparatus of FIG. 1 according to one or more embodiments.

Referring to FIG. 2, in operation 210, a plurality of images may be captured by a camera. For example, a plurality of first images may be captured by the camera, and a receiver (e.g., the receiver 100 of FIG. 1) may receive the plurality of first images captured by the camera.

In operation 230, in a non-limiting example, a processor (e.g., the processor 200 of FIG. 1) may encode a dynamic event of the plurality of first images. The processor 200 may encode a light quantity of the plurality of first images and/or position information of the camera for each of the respective first images. That is to say, encodings of light/position with which the respective first images were captured may be stored in association with the respective first images.

In operation 250, in a non-limiting example, the processor 200 may determine a position (or a background of an image or a path of the camera) of the camera desired by a user in response to a selection of the user. In operation 270, the processor 200 may determine a light quantity of an image desired by the user in response to the selection of the user.

In operation 290, the processor 200 may generate an image by decoding a result desired by the user based on the determined position of the camera and/or light quantity.

Figure 3:
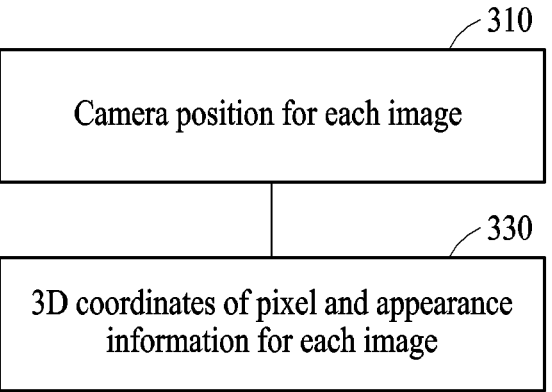
FIG. 3 illustrates an example of data processed from an image according to one or more embodiments.

FIG. 3 illustrates an example of data processed from an image according to one or more embodiments.

Referring to FIG. 3, in a non-limiting example, a processor (e.g., the processor 200 of FIG. 1) may encode dynamic event information of a plurality of first images. The dynamic event information may include a camera position for each image 310 and three-dimensional (3D) coordinates of a pixel and appearance information for each image 330. There may be a dynamic event information for each respective image. The dynamic event may be a process of taking multiple photos or images of a same event, view, or objects, where because of a movement of the camera or imaging device, each image has a different distance and/or light quantity.

Figure 4:
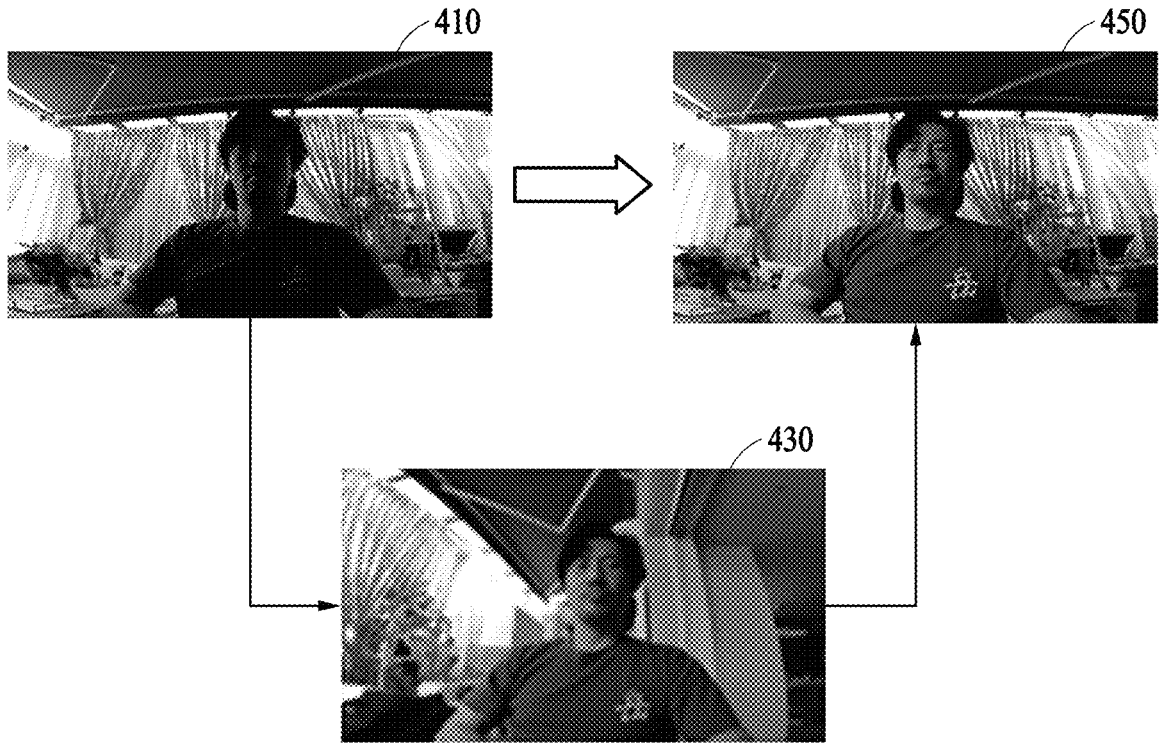
FIG. 4 illustrates an example of an image generating operation of the image generating apparatus of FIG. 1 according to one or more embodiments.
Figure 5A:
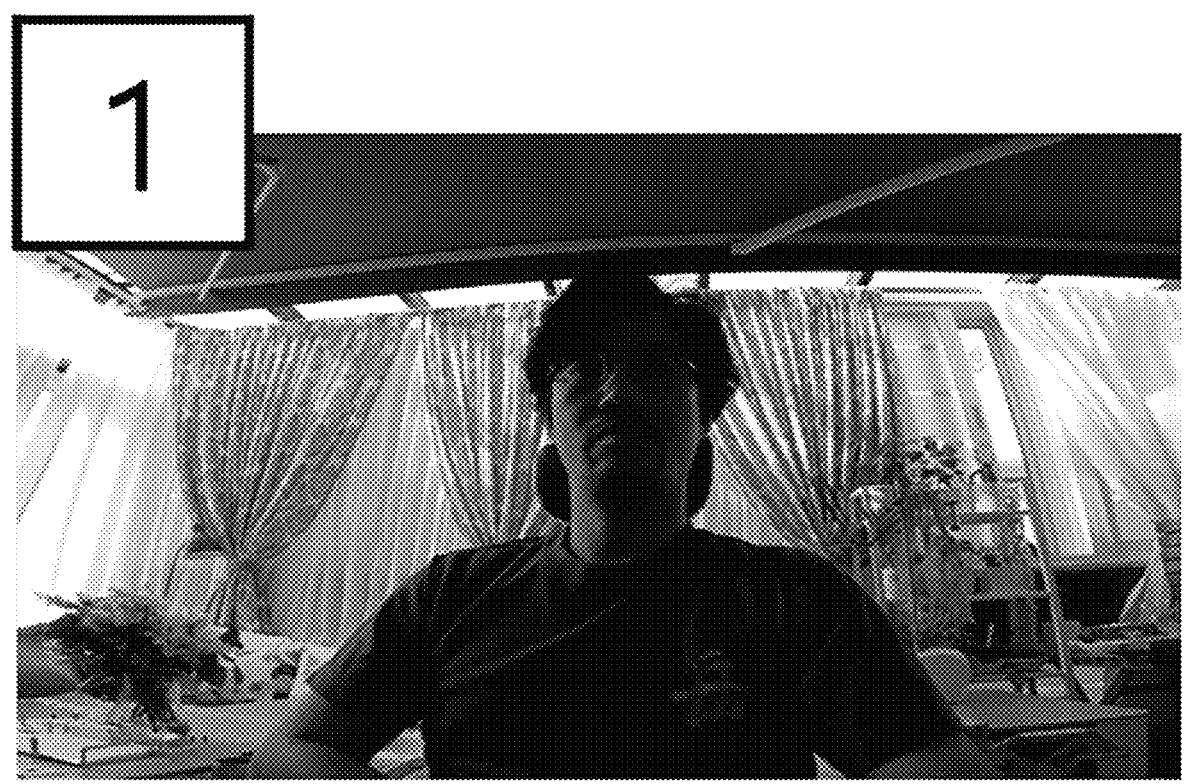
FIGS. 5A through 5E illustrate an example of images captured over time according to one or more embodiments.
Figure 5B:
Figure 5B:
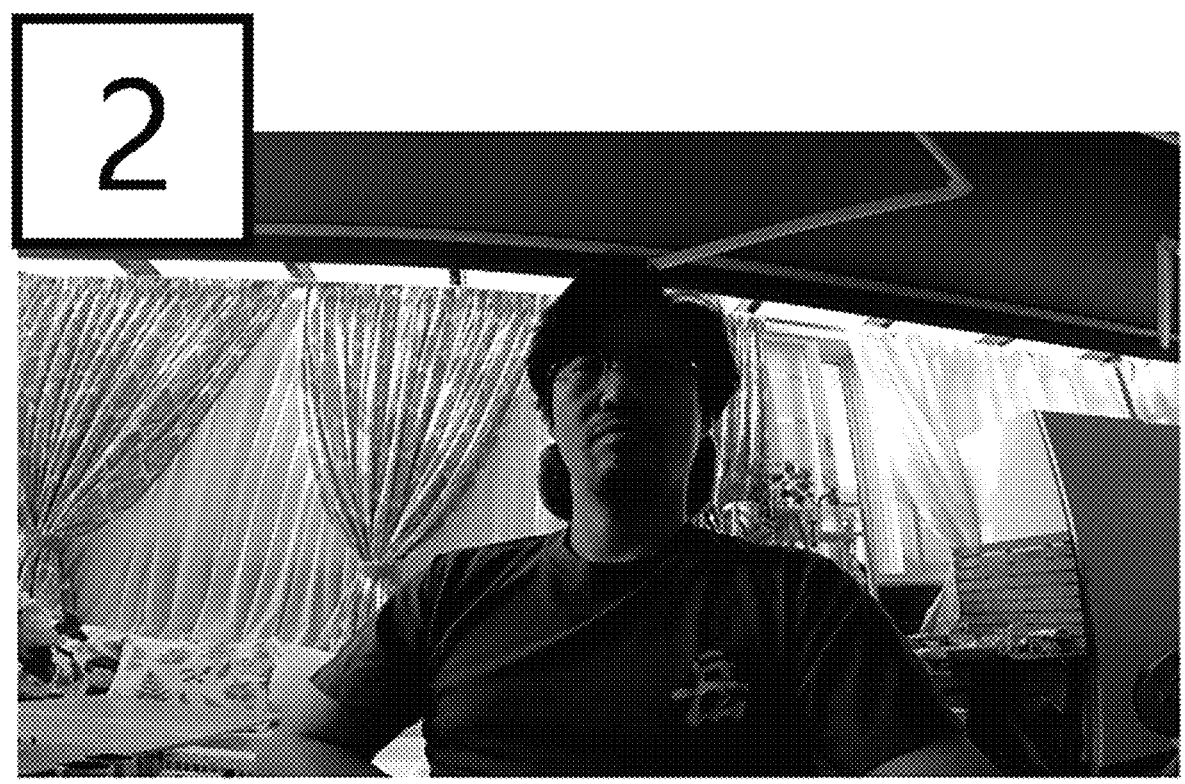
Figure 5C:
Figure 5C:
Figure 5D:
Figure 5D:
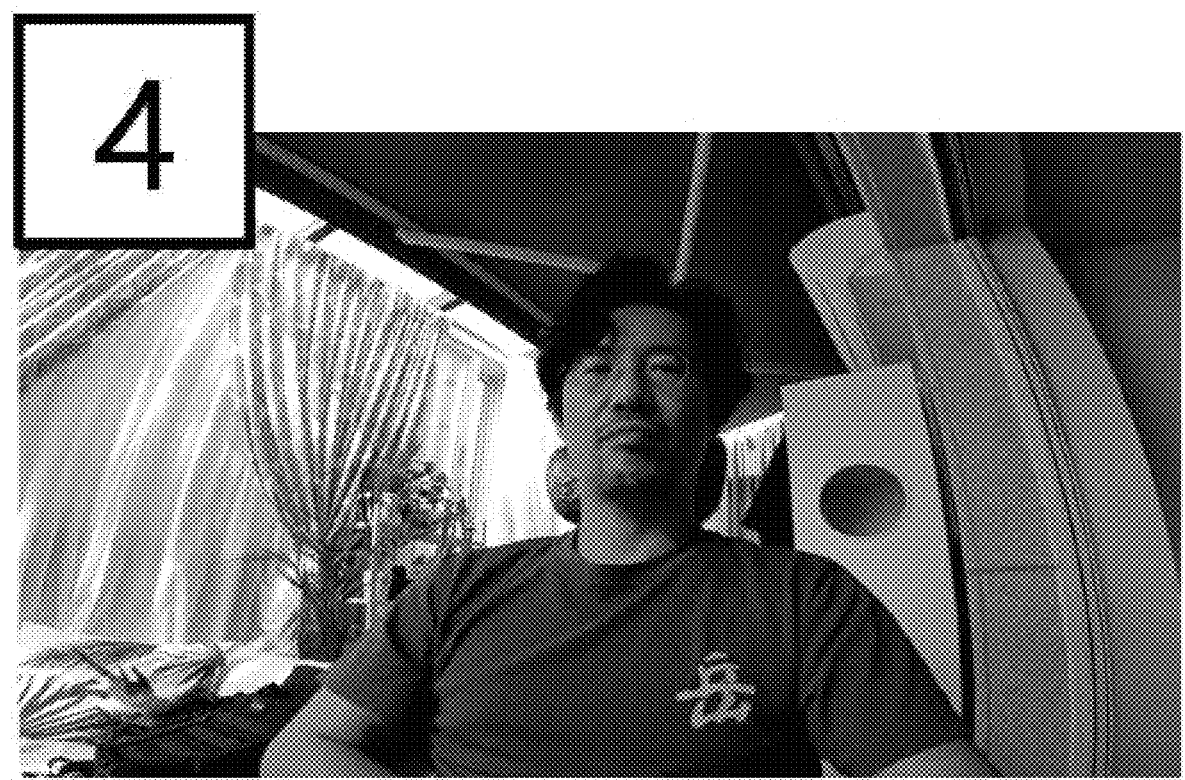
Figure 5E:
Figure 5E:
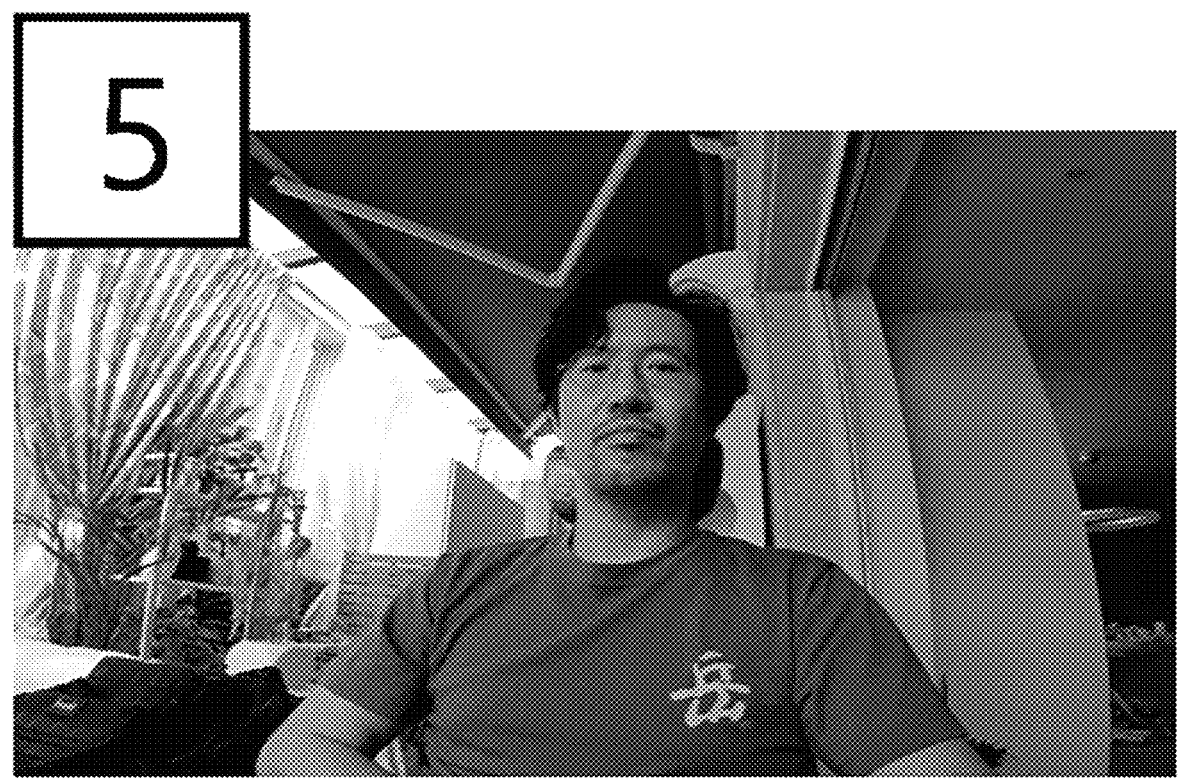
Figure 6A:
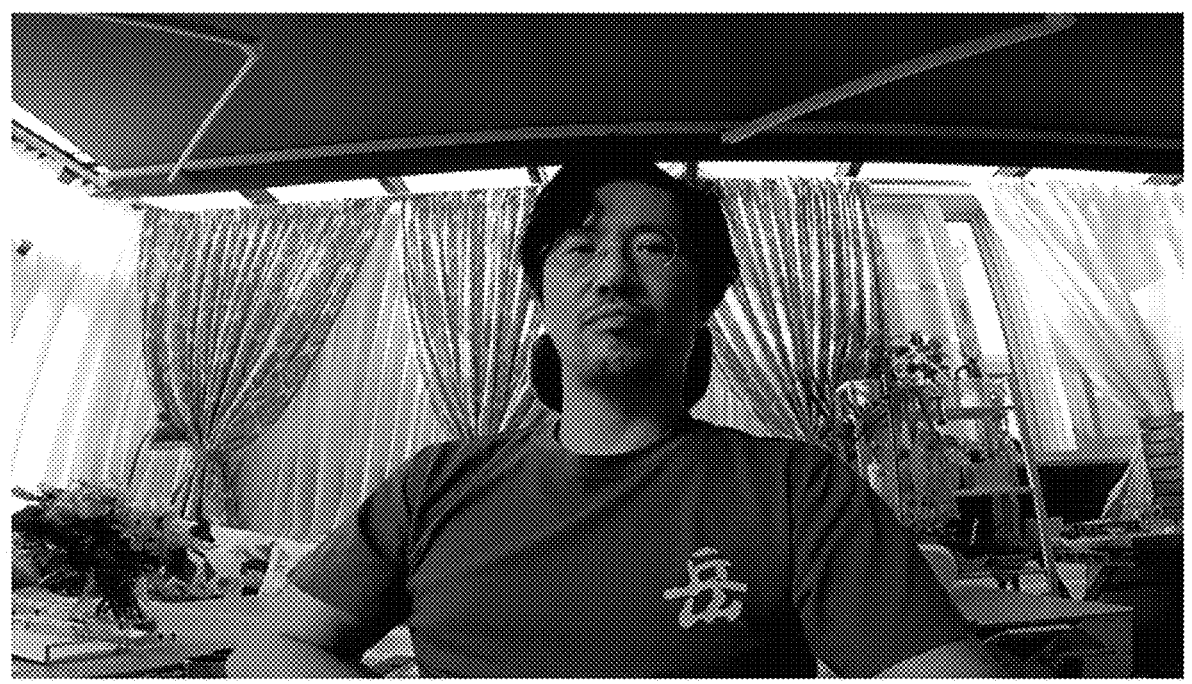
FIGS. 6A through 6E illustrate an example of images captured by changing a position of a camera while a light quantity is fixed according to one or more embodiments.
Figure 6B:
Figure 6B:
Figure 6C:
Figure 6C:
Figure 6D:
Figure 6D:
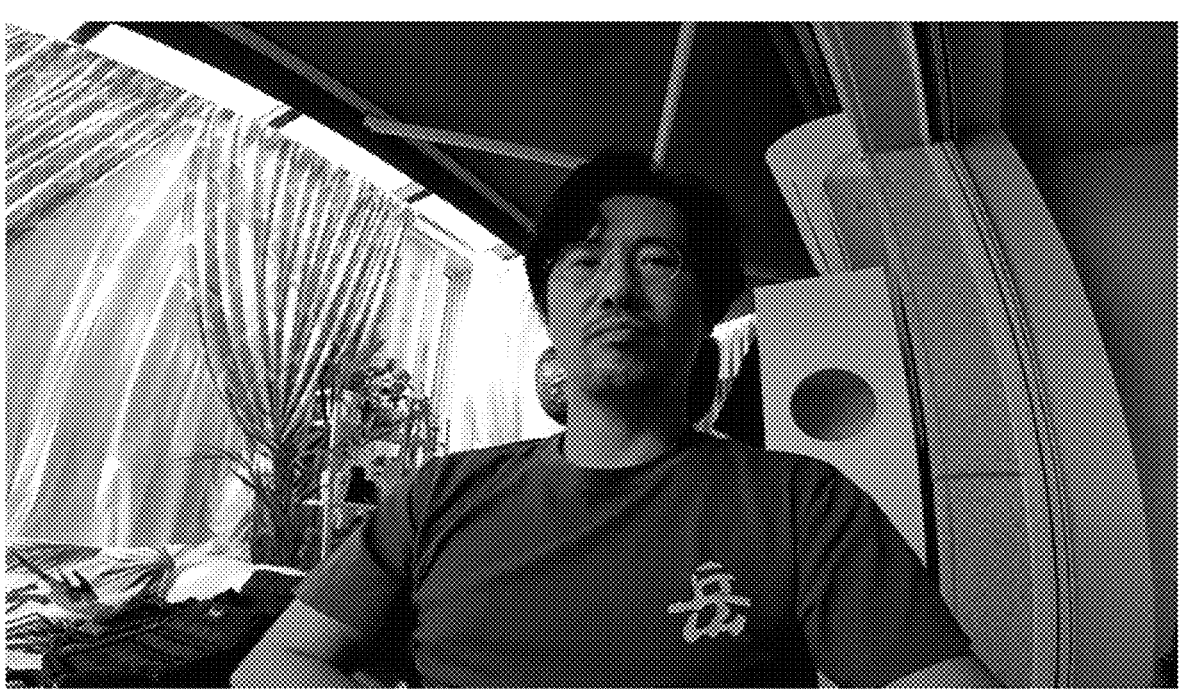
Figure 6E:
Figure 6E:
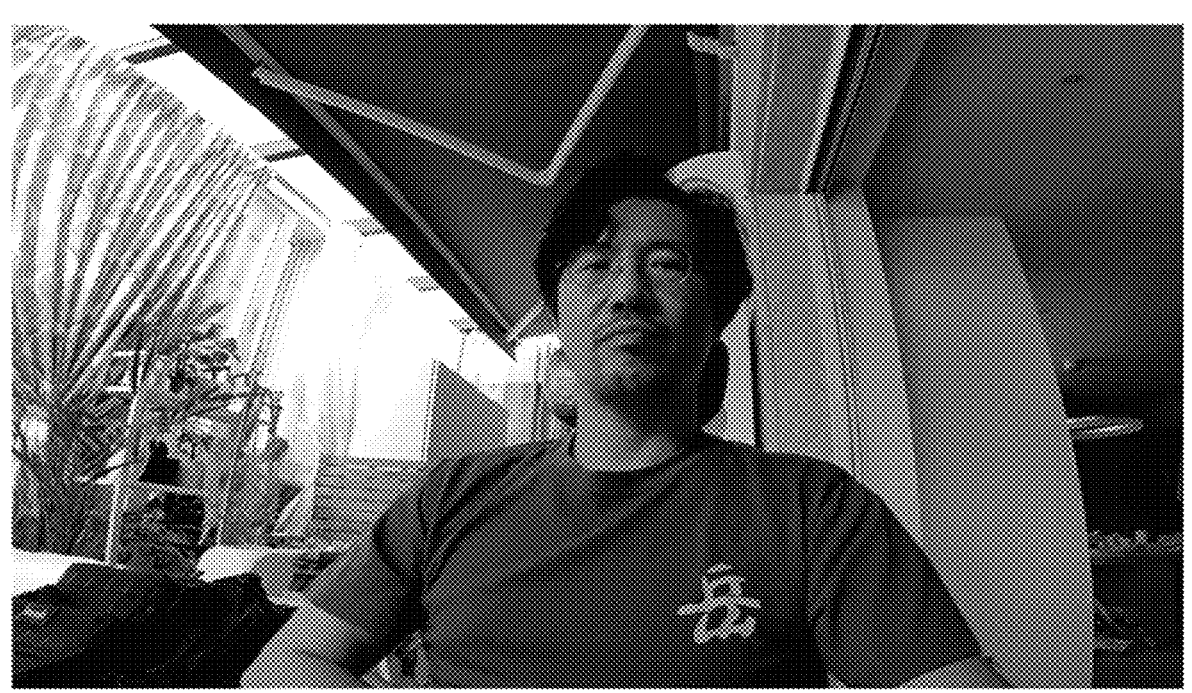
Figure 7A:
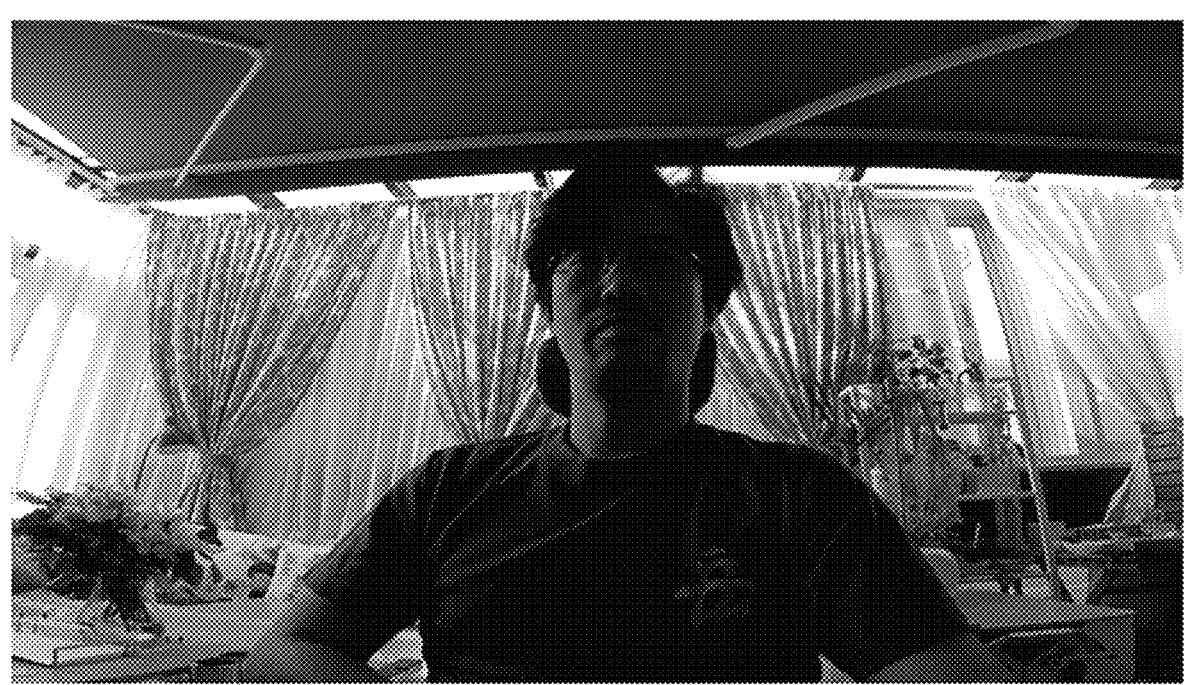
FIGS. 7A through 7E illustrate an example of images captured by changing a light quantity while a position of a camera is fixed according to one or more embodiments.
Figure 7B:
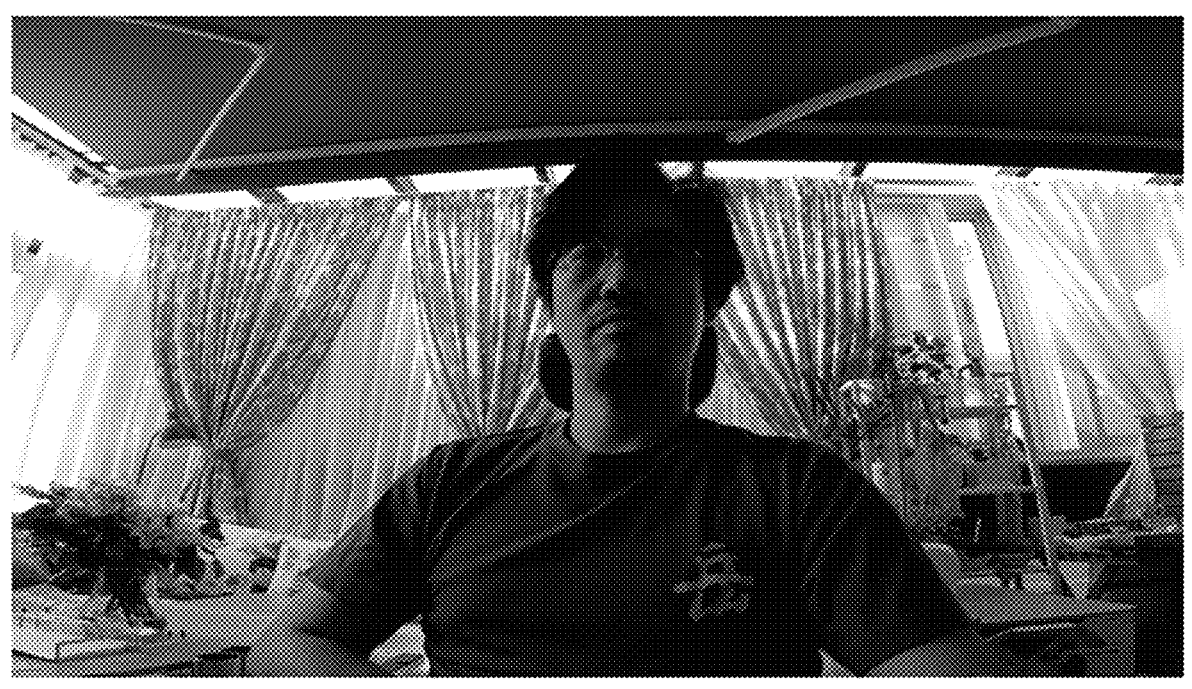
Figure 7C:
Figure 7C:
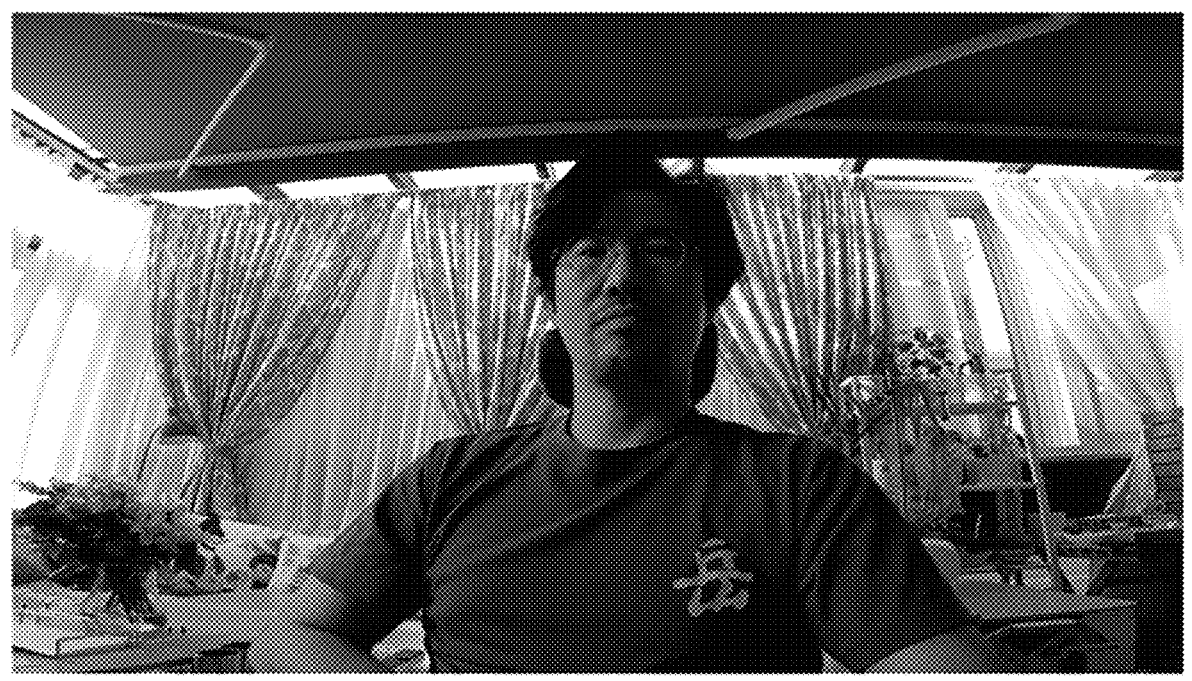
Figure 7D:
Figure 7D:
Figure 7E:

FIG. 4 illustrates an example of an image generating operation of the image generating apparatus of FIG. 1 according to one or more embodiments.

Referring to FIG. 4, a processor (e.g., the processor 200 of FIG. 1) may process a captured image 410 captured by a camera and generate a processed image 450. The processor 200 may generate the processed image 450 by processing the captured image 410 based on a selected image 430 selected by a user. That is, in the example of FIG. 4, the user selects the captured image 410 to manipulate while also selecting the selected image 430 as the basis for the modification of the captured image 410. That is, in an example, the user preferred either the lighting quantity/quality of the selected image 430, or the camera position of the selected image 430, and used that selection as the basis for modifying the captured image 410. In this example, the processed image 450 is a result of the modification of the captured image 410 using the encoded dynamic event information of the selected image 430.

The processor 200 may generate the processed image 450 using a light quantity and/or a position of the camera desired by the user based on the selected image 430 selected by the user. Accordingly, the processor 200 may solve an issue of a shadow created on a face due to a physical property of light and may generate an image with a desired background and desired lighting.

FIGS. 5A through 5E illustrate an example sequence of images captured over time according to one or more embodiments.

Referring to FIGS. 5A through 5E, a receiver (e.g., the receiver 100 of FIG. 1) may receive a plurality of first images. The plurality of first images may be images captured at different times. The plurality of first images may be images captured by a same camera. FIGS. 5A through 5E include images 510-550, respectively.

Images of FIGS. 5A through 5E may be images that are each captured at a different time. For example, FIGS. 5A through 5E may be a sequence of images consecutively captured at predetermined time intervals. Depending on a time at which an image is captured, a position of a camera or a light quantity may vary. Thus, for example, image 510 of FIG. 5A has a different light quality and position information than image 520 of FIG. 5B.

FIGS. 6A through 6E illustrate examples of a plurality of images captured by changing a position of a camera while a light quantity is fixed according to one or more embodiments.

Referring to FIGS. 6A through 6E, a processor (e.g., the processor 200 of FIG. 2) may determine that a light quantity corresponding to one of a plurality of first images is a target light quantity in response to a selection of a user. For example, FIGS. 6A through 6E include images 610-650, respectively. The processor 200 may provide the user with a plurality of second images captured by changing a position of the camera while a light quantity is fixed to the target light quantity.

The processor 200 may fix a light quantity of an image to a light quantity corresponding to an image selected by the user from among the images 510-550 of FIGS. 5A through 5E and may provide a user interface to capture the plurality of second images while moving the position of the camera. Fixing the light quantity may not change a shadow even when the camera moves, and accordingly, the user may simultaneously obtain background and light quantity conditions desired by the user.

FIGS. 7A through 7E illustrate examples of a plurality of images captured by changing a light quantity while a position of a camera is fixed according to one or more embodiments.

Referring to FIGS. 7A through 7E, a processor (e.g., the processor 200 of FIG. 1) may determine that a position of a camera corresponding to one of a plurality of first images is a target camera position in response to a selection of a user. The processor 200 may provide the user with a plurality of third images captured by changing a light quantity while the position of the camera is fixed to the target camera position. For example, FIGS. 7A-7E may include images 710-750, respectively.

FIGS. 7A through 7E illustrate images that show a process of searching for a light quantity while the position of the camera is fixed to a camera position corresponding to an image selected by the user from among the images 510-550 of FIGS. 5A through 5E. The user may select a background desired by the user from among the images of FIGS. 5A through 5E and select a light quantity using dynamic event information captured at a previous point in time. The processor 200 may generate an image based on the selected light quantity.

Figure 8:
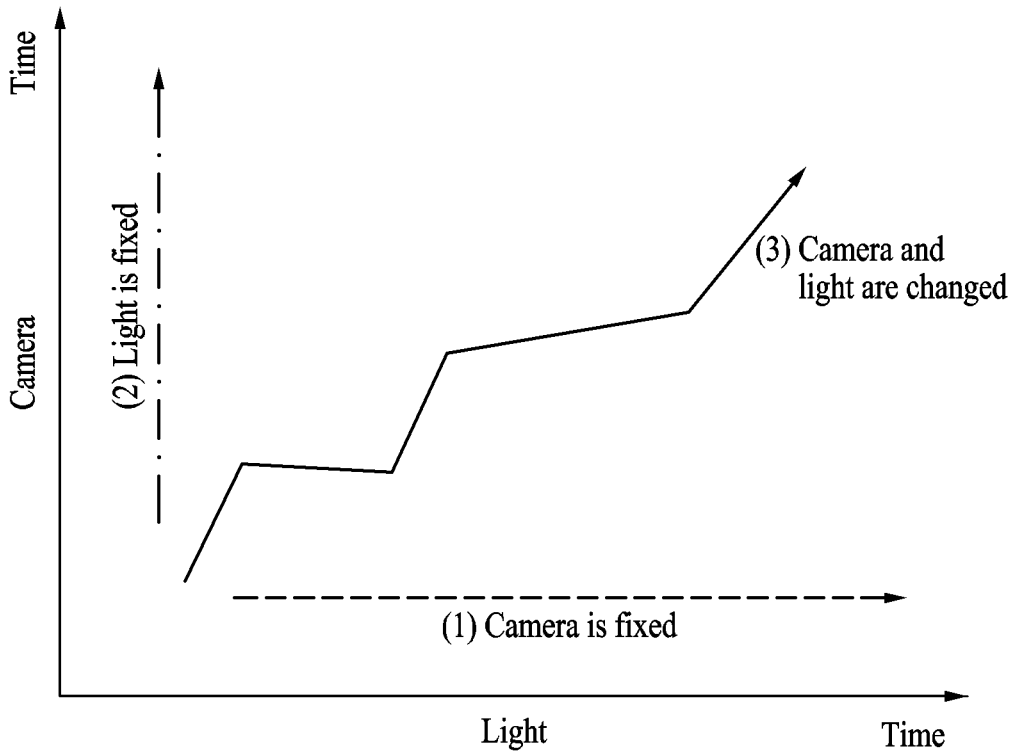
FIG. 8 illustrates an example of searching for a position of a camera and a light quantity over time according to one or more embodiments.

FIG. 8 illustrates an example of a process of searching for a position of a camera and a light quantity over time according to one or more embodiments.

Referring to FIG. 8, in a non-limiting example, a processor (e.g., the processor 200 of FIG. 1) may provide a user interface (e.g., through user interface 400) to perform capturing while at least one of a position of a camera or a light quantity is fixed. The processor 200 may receive a plurality of images in which at least one of the position of the camera or the light quantity is fixed and generate a processed image.

The processor 200 may change the position of the camera and the light quantity at a same time or at different times.

A user may store dynamic event information based on a position of a camera and a light quantity desired by the user based on the user interface provided by the processor 200 and may visualize the position of the camera and the light quantity that change over time.

Figure 9:
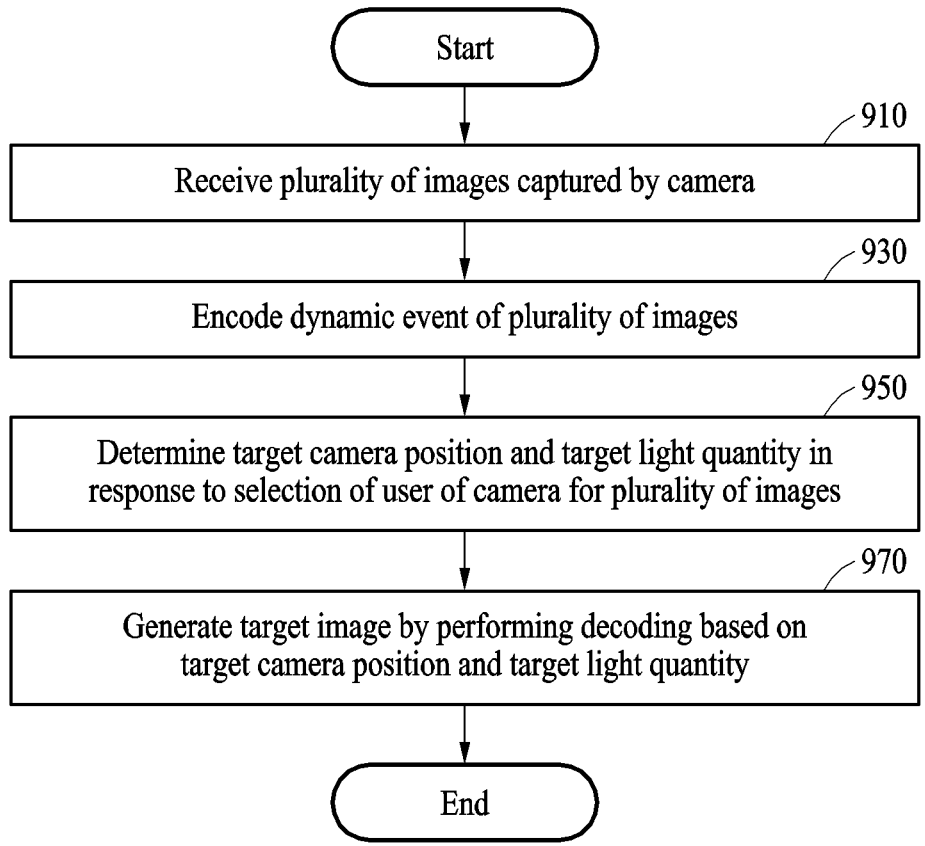
FIG. 9 illustrates an example of an operation of the image generating apparatus of FIG. 1 according to one or more embodiments.

FIG. 9 illustrates an example of an operation of the image generating apparatus of FIG. 1 according to one or more embodiments.

Referring to FIG. 9, in operation 910, a receiver (e.g., the receiver 100 of FIG. 1) may receive a plurality of first images captured by a camera.

In operation 930, a processor (e.g., the processor 200) may encode a dynamic event of the plurality of first images. The processor 200 may encode a light quantity of the plurality of first images and a position of the camera.

Each of the plurality of first images may be captured at a different time. The plurality of first images may be captured by a same camera.

In operation 950, in a non-limiting example, the processor 200 may determine a target camera position and a target light quantity in response to a selection of a user of the camera for the plurality of first images.

The processor 200 may determine that a light quantity corresponding to one of the plurality of first images is the target light quantity in response to the selection. The processor 200 may provide the user with a plurality of second images captured by changing the position of the camera while the light quantity is fixed to the target light quantity.

The processor 200 may determine that a position of the camera corresponding to one of the plurality of first images is the target camera position in response to the selection. The processor 200 may provide the user with a plurality of third images captured by changing the light quantity while the position of the camera is fixed to the target camera position.

The processor 200 may provide a user interface for changing the light quantity and the position of the camera to capture the plurality of first images.

The processor 200 may generate the plurality of first images by simultaneously changing the position of the camera and the light quantity and may provide the plurality of first images to the user.

In operation 970, the processor 200 may generate a target image by performing decoding based on the target camera position and the target light quantity.

The processors, memories, receiver, user interface, image generating apparatus 10, receiver 100, processor 200, memory 300, user interface 400, and display 500 described herein and disclosed herein described with respect to FIGS. 1-9 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. An apparatus, comprising:
   a processor configured to execute a plurality of instructions; and
   a memory storing the plurality of instructions, wherein execution of the plurality of instructions configures the processor to be configured to:
      encode a dynamic event comprising a plurality of first images received from a camera;
      receive a selection of a target camera position and a target light quantity in response to a user input from among the plurality of first images; and generate a target image by performing decoding based on the target camera position and the target light quantity.

2. The apparatus of claim 1, wherein each of the plurality of first images is captured at a different time.

3. The apparatus of claim 1, wherein the plurality of first images is captured by a same camera.

4. The apparatus of claim 1, wherein the processor is further configured to encode a light quantity of the plurality of first images and a position of the camera.

5. The apparatus of claim 1, wherein the processor is further configured to provide a user interface for changing a light quantity and a position of the camera to capture the plurality of first images.

6. The apparatus of claim 1, wherein the processor is further configured to:

determine that a light quantity corresponding to one of the plurality of first images is the target light quantity in response to the selection; and generate a plurality of second images by changing a position of a camera while a light quantity is fixed to the target light quantity.

7. The apparatus of claim 1, wherein the processor is further configured to:

determine that a position of a camera corresponding to one of the plurality of first images is the target camera position in response to the selection; and generate a plurality of third images by changing a light quantity while the position of the camera is fixed to the target camera position.

8. The apparatus of claim 1, wherein the processor is further configured to:

generate a plurality of fourth images from the plurality of first images by simultaneously modifying a position of the camera and a light quantity in each image of the plurality of first images; and provide the plurality of fourth images as options for the selection.

9. A processor implemented method, the method comprising:

encoding a dynamic event of a plurality of first images;

selecting a target camera position and a target light quantity in response to a user input from among the plurality of first images; and generating a target image by performing decoding based on the target camera position and the target light quantity.

10. The method of claim 9, wherein each of the plurality of first images is captured at a different time.

11. The method of claim 9, wherein the plurality of first images is captured by a same camera.

12. The method of claim 9, wherein the encoding of the dynamic event comprises encoding a light quantity of the plurality of first images and a position of a camera.

13. The method of claim 9, further comprising:

providing a user interface for changing a light quantity and a position of a camera to capture the plurality of first images.

14. The method of claim 9, wherein the selecting of the target camera position and the target light quantity comprises:

determining that a light quantity corresponding to one of the plurality of first images is the target light quantity in response to the selection; and generating a plurality of second images by changing a position of a camera while a light quantity is fixed to the target light quantity.

15. The method of claim 9, wherein the selecting of the target camera position and the target light quantity comprises:

determining that a position of a camera corresponding to one of the plurality of first images is the target camera position in response to the selection; and generating a plurality of third images by changing a light quantity while the position of the camera is fixed to the target camera position.

16. The method of claim 9, further comprising:

generating a fourth plurality of images from the plurality of first images by simultaneously changing a position of the camera and a light quantity; and providing the plurality of fourth images as options for the selection.

17. A non-transitory computer-readable storage medium storing instructions that, when executed by a processor, cause the processor to perform the method of claim 9.

\* \* \* \* \*